US012703821B2

(12) United States Patent
Rabie et al.

(10) Patent No.: US 12,703,821 B2
(45) Date of Patent: Aug. 11, 2026

(54) VISCOELASTIC SURFACTANT FORMULATIONS AND USE IN SUBTERRANEAN FORMATIONS

(71) Applicant: ENERGY SOLUTIONS (US) LLC, Princeton, NJ (US)

(72) Inventors: Ahmed I. Rabie, Willingboro, NJ (US); Arnaud Cadix, Lille (FR); Rose Ndong, Dakar (SN); Pascal Herve, Princeton, NJ (US); Qi Qu, Tomball, TX (US); Jian Zhou, Langhorne, PA (US)

(73) Assignee: ENERGY SOLUTIONS (US) LLC, Princeton, NJ (US)

( * ) Notice: Subject to any disclaimer, the term of this patent is extended or adjusted under 35 U.S.C. 154(b) by 0 days.

(21) Appl. No.: 18/517,185

(22) Filed: Nov. 22, 2023

(65) Prior Publication Data

US 2024/0182778 A1 Jun. 6, 2024

Related U.S. Application Data

(60) Provisional application No. 63/427,550, filed on Nov. 23, 2022.

(51) Int. Cl.
*C09K 8/584* (2006.01)
*E21B 43/28* (2006.01)

(52) U.S. Cl.
CPC .............. *C09K 8/584* (2013.01); *E21B 43/28* (2013.01); *C09K 2208/30* (2013.01)

(58) Field of Classification Search
None
See application file for complete search history.

(56) References Cited

U.S. PATENT DOCUMENTS

| | | | |
|---|---|---|---|
| 6,903,054 | B2 | 6/2005 | Fu et al. |
| 7,897,547 | B1 | 3/2011 | Lin et al. |
| 10,047,279 | B2 | 8/2018 | Li et al. |
| 10,308,866 | B2 | 6/2019 | Li et al. |
| 10,407,606 | B2 | 9/2019 | Li et al. |
| 2002/0004464 | A1 | 1/2002 | Nelson et al. |
| 2002/0033260 | A1 | 3/2002 | Lungwitz et al. |
| 2002/0193257 | A1 | 12/2002 | Lee et al. |
| 2003/0062160 | A1 | 4/2003 | Boney et al. |
| 2003/0119680 | A1 | 6/2003 | Chang et al. |
| 2003/0236174 | A1 | 12/2003 | Fu et al. |
| 2004/0045710 | A1 | 3/2004 | Fu et al. |
| 2004/0214725 | A1 | 10/2004 | Moss |
| 2005/0124500 | A1 | 6/2005 | Chen et al. |
| 2006/0063681 | A1 | 3/2006 | Christanti et al. |
| 2006/0084579 | A1 | 4/2006 | Berger et al. |
| 2007/0129262 | A1 | 6/2007 | Gurmen et al. |
| 2007/0187105 | A1 | 8/2007 | Chatterji et al. |
| 2007/0213232 | A1 * | 9/2007 | Hartshorne .............. C09K 8/68 507/239 |
| 2008/0139410 | A1 | 6/2008 | Chen et al. |
| 2008/0161207 | A1 | 7/2008 | Welton et al. |
| 2010/0022418 | A1 | 1/2010 | Milne et al. |
| 2012/0111562 | A1 | 5/2012 | Degre et al. |
| 2014/0367111 | A1 | 12/2014 | Gamage et al. |
| 2020/0131431 | A1 | 4/2020 | Russum |

FOREIGN PATENT DOCUMENTS

| | | | |
|---|---|---|---|
| CN | 1836090 | A | 9/2006 |
| CN | 102093874 | B | 11/2012 |
| CN | 103421481 | A | 12/2013 |
| CN | 102559166 | B | 1/2014 |
| CN | 106634936 | A | 5/2017 |
| CN | 111117588 | A | 5/2020 |
| WO | 2005118743 | A2 | 12/2005 |
| WO | 2014140055 | A1 | 9/2014 |

OTHER PUBLICATIONS

International Search Report issued in corresponding International Application No. PCT/US2023/080834, dated Mar. 4, 2024 (6 pages).
Written Opinion issued in corresponding International Application No. PCT/US2023/080834, dated Mar. 4, 2024 (8 pages).

* cited by examiner

*Primary Examiner* — Andrew Sue-Ako
(74) *Attorney, Agent, or Firm* — Ipsilon USA—NLO

(57) ABSTRACT

A viscoelastic surfactant formulation may include a zwitterionic surfactant with a general formula (I):

(I)

where A is a C or SO, $E^1$ is a linear or branched, saturated or unsaturated hydrocarbon chain having 1 to 4 carbon atoms, $R^1$ and $R^2$ are selected from alkyl groups of from 1 to about 4 carbon atoms, and $R^3$ is a linear or branched, saturated or unsaturated alkyl chain having less than 22 carbon atoms or is $-(CH_2)_n$ NHC(O)—$R^4$, where $R^4$ is a linear or branched, saturated or unsaturated alkyl chain having less than 22 carbon atoms and n ranges from 1 to 6; a synergistic co-surfactant containing a primary, secondary, or tertiary amine; amido group; amine oxide; or combinations thereof; and at least one miscible solvent.

18 Claims, No Drawings

VISCOELASTIC SURFACTANT FORMULATIONS AND USE IN SUBTERRANEAN FORMATIONS

BACKGROUND

Viscoelastic surfactant (VES) systems have continued to grow in use for rheology control for well stimulation because of their advantages over conventional polymer systems. VES are usually preferred for being a non-damaging fluid, easier to flowback with minimum pressure, functioning as a single-component system with minimum operational and logistical requirements, and the ability to break within eliminating the need for enzymes or oxidizers.

However, the cost of such specialty chemicals has always been the challenge that limited their applications in the field. High performing VES are typically made from long hydrophobes that are driven from specific plant-based raw materials. The seasonal nature and availability of such resources contribute to the high cost of VES and the inconsistency in product availability.

Well stimulation, or production enhancement, can be achieved by either hydraulic fracturing or acidizing. Hydraulic fracturing includes pumping specially engineered fluids at high pressures into the rock formation surrounding the well in order to create fractures that are held open by the proppant particles present in the fluid once the treatment is completed.

In contrast, acidizing, and in particular matrix acidizing, consists of injecting acid into the rock formation at pressure that is lower than the fracture pressure. The acid penetrates the porosity of the rock and reacts to dissolve rocks as well as residue in the near wellbore, creating pathways or wormholes to ease the flow of oil to the well. Acidizing can be performed on new wells to maximize their initial productivity and on aging wells to restore productivity and maximize the recovery of the energy resources.

Acidizing is a traditional treatment to stimulate subterranean carbonate and sandstone formations aiming to increase hydrocarbon production. Carbonate formations are typically characterized by a high degree of heterogeneity in which hydrocarbon-bearing producing layers can have substantial difference of permeability. Acidizing with straight acids such as hydrochloric, acetic, formic acids, or recently introduced chelating agents will not be effective because acid would preferentially flow into the high permeable zone which may lead to excess rock dissolution and weakening the near wellbore integrity. On the other hand, much less volume of the injected acid would penetrate the lower permeability layers and hence poor treatment results.

Diverting agents are therefore necessary to force acid flow into the low-permeable zone. Conceptually, a diverting surfactant-based agent form a gel once the acid is spent by reaction with the rock in the high-permeable layer. The in-situ gelation of the diverting agent would temporarily reduce the permeability of the high permeability layer to a comparable level of the low-permeable layer. Therefore, both layers accept similar subsequent acid flow and the low-permeable zone is treated. A main advantage of the surfactant-based diverting agent is that the formed gel in the high-permeable layer is usually easy to break either by a post treatment or internally by a slow-released substance. The overall acid treatment with a diverting agent induces a substantial increase in oil productivity due to the flow from both high and low-permeable layers.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a viscoelastic surfactant formulation that includes a zwitterionic surfactant with a general formula (I):

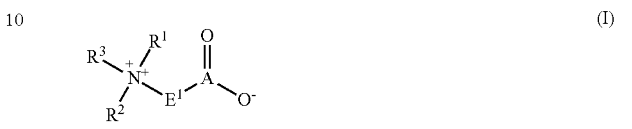

(I)

where A is a C or SO, $E^1$ is a linear or branched, saturated or unsaturated hydrocarbon chain having 1 to 4 carbon atoms, $R^1$ and $R^2$ are selected from alkyl groups of from 1 to about 4 carbon atoms, and $R^3$ is a linear or branched, saturated or unsaturated alkyl chain having less than 22 carbon atoms or is $-(CH_2)_n$ NHC(O)—$R^4$, where $R^4$ is a linear or branched, saturated or unsaturated alkyl chain having less than 22 carbon atoms and n ranges from 1 to 6; a synergistic co-surfactant containing a primary, secondary, or tertiary amine; amido group; amine oxide; or combinations thereof; and at least one miscible solvent.

In another aspect, embodiments disclosed herein relate to a well treatment fluid that includes an aqueous fluid; an acid; a zwitterionic surfactant with a general formula (I):

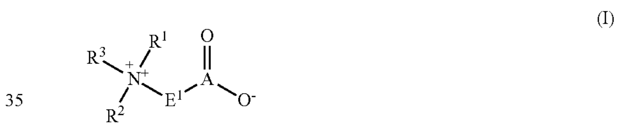

(I)

where A is a C or SO, $E^1$ is a linear or branched, saturated or unsaturated hydrocarbon chain having 1 to 4 carbon atoms, $R^1$ and $R^2$ are selected from alkyl groups of from 1 to about 4 carbon atoms, and $R^3$ is a linear or branched, saturated or unsaturated alkyl chain having less than 22 carbon atoms or is $-(CH_2)_n$ NHC(O)—$R^4$, where $R^4$ is a linear or branched, saturated or unsaturated alkyl chain having less than 22 carbon atoms and n ranges from 1 to 6; and a synergistic co-surfactant containing a primary, secondary, or tertiary amine; amido group; amine oxide; or combinations thereof.

In yet another aspect, embodiments disclosed herein relate to a method of treating a formation that includes injecting a well treatment fluid into a formation, where the well treatment fluid includes an aqueous fluid; an acid; a zwitterionic surfactant with a general formula (I):

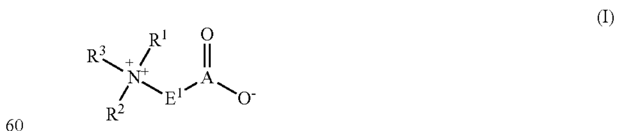

(I)

where A is a C or SO, $E^1$ is a linear or branched, saturated or unsaturated hydrocarbon chain having 1 to 4 carbon atoms, $R^1$ and $R^2$ are selected from alkyl groups of from 1 to about 4 carbon atoms, and $R^3$ is a linear or branched, saturated or unsaturated alkyl chain having less than 22 carbon atoms or is $-(CH_2)$, NHC(O)—$R^4$, where $R^4$ is a linear or branched, saturated or unsaturated alkyl chain having less than 22 carbon atoms and n ranges from 1 to 6; and a synergistic co-surfactant containing a primary, secondary, or tertiary amine; amido group; amine oxide; or combinations thereof.

In yet another aspect, embodiments disclosed herein relate to use of a zwitterionic surfactant and synergistic co-surfactant as a diverting fluid for acidizing operations, wherein the zwitterionic surfactant with a general formula (I):

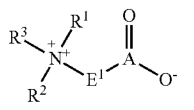

(I)

where A is a C or SO, $E^1$ is a linear or branched, saturated or unsaturated hydrocarbon chain having 1 to 4 carbon atoms, $R^1$ and $R^2$ are selected from alkyl groups of from 1 to about 4 carbon atoms, and $R^3$ is a linear or branched, saturated or unsaturated alkyl chain having less than 22 carbon atoms or is $—(CH_2)$, NHC(O)—$R^4$, where $R^4$ is a linear or branched, saturated or unsaturated alkyl chain having less than 22 carbon atoms and n ranges from 1 to 6; and the synergistic co-surfactant contains a primary, secondary, or tertiary amine; amido group; amine oxide; or combinations thereof.

Other aspects and advantages of the claimed subject matter will be apparent from the following description and the appended claims.

DETAILED DESCRIPTION

Embodiments disclosed herein relate to viscoelastic surfactant (VES) formulation compositions. The VES formulation compositions include a zwitterionic surfactant and a synergistic co-surfactant. Embodiments also relate to a well treatment fluid containing such viscoelastic surfactants as well as methods of treating a formation. It is envisioned that the viscoelastic surfactants may be directed added to a well treatment fluid or may be provided as a pre-blended VES formulation that is in turn added to the well treatment fluid. The method of treating a formulation includes injecting the well treatment fluid into a formation. Embodiments of the present disclosure further relate to a method of injecting the well treatment fluid during acidizing operation and using the VES formulation as a diverting fluid for acidizing operations. One or more embodiments relate to well-performing viscoelastic surfactants with stable and consistent viscosity for elevated temperature applications.

Viscoelasticity is observed with specific compositions of surfactants in given solution conditions defined by surfactants concentration, temperature and ionic strength. The viscoelasticity is caused by the formation of extended micelles which are often referred to as worm-like, rod-like or cylindrical micelles in solution. The formation of long, cylindrical micelles induce useful rheological properties. Viscoelastic surfactant solutions exhibit shear thinning behavior and remain stable despite repeated high shear applications. By comparison, a typical polymeric thickener will irreversibly degrade when subjected to high shear applications.

In accordance with the present disclosure, the viscoelastic surfactant formulation includes a zwitterionic surfactant such as a betaine, and a synergistic co-surfactant containing a primary, secondary, or tertiary amine; amido groups or combinations thereof.

Zwitterionic Surfactant

A zwitterionic surfactant according to the present disclosure a permanently positively charged moiety in the molecule regardless of pH and a negatively charged moiety at alkaline pH. In the present description, betaines are defined in the instant description as compounds carrying a quaternary ammonium (said quaternary ammonium being not a protonated amine) and a non-adjacent acid group. Betaines can include carboxybetaines having a carboxylate group —COO—, optionally in all or part in its protonated form —COOH, and sulfobetaines having a sulfonate group $—SO_3^-$, optionally in all or part in its protonated (sulfonic acid) form $—SO_3H$.

In one or more embodiments, the zwitterionic surfactant in the viscoelastic surfactant formulation according to the present disclosure may be represented by general formula (I):

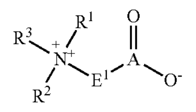

(I)

where A is a C or SO, $E^1$ is a linear or branched, saturated or unsaturated hydrocarbon chain having 1 to 4 carbon atoms, $R^1$ and $R^2$ are selected from alkyl groups of from 1 to about 4 carbon atoms, particular methyl groups, and $R^3$ is a linear or branched, saturated or unsaturated alkyl chain having less than 22 carbon atoms or is $—(CH_2)$, NHC(O)—$R^4$, where $R^4$ is a linear or branched, saturated or unsaturated alkyl chain having less than 22 carbon atoms and n ranges from 1 to 6. In one or more embodiments, $R^4$ has from 16 to 20 carbon atoms, preferably 18 carbon atoms.

In one or more embodiments, examples of zwitterionic surfactants may include but are not limited to, betaines or sulfobetaines. In one or more embodiments, the zwitterionic surfactant may include betaines such as alkyl betaines and alkyl amidopropyl betaine such as oleyl amidopropyl betaine.

The zwitterionic surfactant may be present in the VES formulation in an amount ranging from 5 wt % to 60 wt % by weight of the VES formulation composition, for example. Such a VES formulation may be used for practical considerations where the zwitterionic surfactant and co surfactant are be supplied as a single preblended formulation. In one or more embodiments, the zwitterionic surfactant may be present in the well treatment fluid in an amount ranging from 0.5 to 5 wt % of the treatment fluid, such as from a lower limit of any of 0.5 or 1 wt % to an upper limit of any of 3 or 5 wt %, where any lower limit can be used in combination with any upper limit.

Synergistic Co-Surfactant

As mentioned above, a synergistic co-surfactant is present in the viscoelastic formulation, and helps increase and maintain a stable viscosity at elevated temperature in the treatment fluid.

In one or more embodiments, the synergistic co-surfactant may contain a primary, secondary, or tertiary amine; amido group; amine oxide; or combinations thereof.

In one or more embodiments of the present disclosure, the synergistic co-surfactant includes aminated surfactants or surfactants containing amides such as but not limited to alkyl amines (including primary, secondary, or tertiary amines), alcohol amides, amine-oxides, or combinations thereof. In one or more embodiments, the synergistic co-surfactant has the formula:

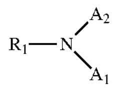

where $R^1$ is a branched or linear, saturated or unsaturated alkyl chain with 9 to 18 carbon atoms or an alkyl aryl bearing a linear or branched alkyl chain ranging from 4 to 16 carbon atoms; or is $R_0$—C(O)— where $R_0$ is a branched or linear, saturated or unsaturated alkyl chains with 9 to 18 carbon atoms or an alkyl aryl bearing a linear or branched alkyl chain ranging from 4 to 16 carbon atoms; and $A_1$ and $A_2$ are independently selected from H, $—CH_2CH_2OH$ or $—(CH_2CH_2—O—)_nH$ or $—(CH_2)_x—NH_2$, where n ranges from 1 to 4, and x ranges from 1 to 4.

Examples of suitable synergistic surfactants in one or more embodiments include but are not limited to alkyl amines having branched or linear, saturated or unsaturated alkyl chains with 9 to 18 carbon atoms (such as oleylamine), fatty acid diethanolamide (such as diethanol oleyl amide), tallow alkyl amine ethoxylate, or tallow di-amine ethoxylate.

The co-surfactant concentration may be determined, relative to the total amount of surfactant present, using the formula below:

$$\text{Co-surfactant concentration, wt \%} = \frac{B}{A+B} * 100$$

wherein B is the weight of co-surfactant and A is the weight of the zwitterionic surfactant.

The synergistic co-surfactant may be present in an amount ranging from 7 wt % to 22 wt % by weight of the total amount of surfactant, for example, from a lower limit of any of 7, 7.5, or 8.0 wt % to an upper limit of any of 12, 15, 20, or 22 wt %, where any lower limit can be used in combination with any upper limit.

Solvent

When the zwitterionic surfactant and synergistic co-surfactant are supplied as pre-blended formulation, one or more solvents may be present as the balance of the formulation. Solvent in the viscoelastic surfactant formulation may be any miscible solvent such as water and/or an organic solvent. Examples of suitable solvents include but are not limited to water, secondary alcohols, glycols, glycol ethers, acetone, glycerol or combinations thereof.

Well Treatment Fluid

In one or more embodiments, the VES formulation may be used to form a well treatment fluid, or the zwitterionic surfactant and synergistic co-surfactant may be added directly to the well treatment fluid without being preblended together. The VES surfactant(s) may be present in a treatment fluid in an amount sufficient to provide a desired viscosity (e.g., sufficient viscosity to divert flow, reduce acid reaction rate, reduce fluid loss, etc.) through the formation of the desired micelles. Whether preblended as a VES formulation or added directly, the VES formulation or surfactants may be added to the well treatment fluid such that the active surfactant content in the treatment fluids ranges from about 0.5% to about 5% by weight of the fluid, such as from about 1% to about 4% by weight of the fluid.

The aqueous base fluid used in the treatment fluids of the present disclosure may comprise fresh water, saltwater (e.g., water containing one or more salts dissolved therein), brine (e.g., saturated saltwater), seawater, or combinations thereof. Generally, the water may be from any source, provided that it does not contain components that might adversely affect the stability and/or performance of the treatment fluids of the present disclosure.

The acids present in the treatment fluids of the present disclosure may comprise organic acids, inorganic acids, derivatives thereof, or combinations thereof. Examples of suitable acids include, but are not limited to, hydrochloric acid, hydrofluoric acid, organic acids, and mixtures thereof. In one or more embodiments, the acid may be present in the treatment fluids in an amount of from about 5% to about 30% by weight of the fluid, such as from about 10% to about 20% by weight of the fluid.

To provide the ionic strength for the desired micelle formation, the treatment fluids may optionally comprise a water-soluble salt to promote micelle formation for the viscosification of the fluid. The salt may be present in the fluid as formulated, or after the treatment fluid is introduced in the wellbore so that micelle formation does not occur until a desired time. In one or more embodiments, the aqueous base fluid may contain the water-soluble salt, for example, where saltwater, a brine, or seawater is used as the aqueous base fluid. Suitable water-soluble salts may comprise ammonium, lithium, sodium, potassium, cesium, magnesium, calcium, or zinc cations, and chloride, bromide, iodide, or formate. Examples of suitable water-soluble salts that comprise the above-listed anions and cations include, but are not limited to, ammonium chloride, lithium bromide, lithium chloride, lithium formate, calcium bromide, calcium chloride, calcium formate, sodium bromide, sodium chloride, sodium formate, potassium chloride, potassium bromide, potassium formate, cesium formate, cesium chloride, cesium bromide, magnesium chloride, magnesium bromide, zinc chloride, zinc bromide, and combinations thereof. In certain embodiments, the water-soluble salt may be present in the treatment fluids of the present disclosure in an amount in the range of from about 1% to about 10% by weight of the fluid, such as from about 5% to about 10% by weight of the fluid.

The treatment fluids of the present disclosure may optionally include particulates (such as proppant particulates) suitable for use in subterranean applications. Particulates suitable for use in the present invention may comprise any material suitable for use in subterranean operations such as sand, bauxite, ceramic materials, glass materials, and combinations thereof.

The treatment fluids of the present disclosure may also optionally include additional additives, including, but not limited to, corrosion inhibitors, scale inhibitors, fluid loss control additives, gas, non-emulsifiers, paraffin inhibitors, asphaltene inhibitors, hydrate inhibitors, sludge control agents, clay control agents, biocides, friction reducers, combinations thereof and the like.

Properties of Viscoelastic Surfactant Formulations

In one or more embodiments, the VES-containing treatment fluid may have a viscosity of more than 85 cP, using a rotational bob and cup Grace 5600 high pressure/high temperature viscometer at a shear rate of 100 $s^{-1}$. In one or more embodiments, the VES formulations may have a viscosity of more than 85 cP, or 100 cP, or 110 cP, or 120 cP, or 130 cP, or 140 cP, or even 150 cP. Moreover, such viscosity is achieved in at an elevated temperature that is at least 225° F., such as at 225° F. or 250° F.

As previously discussed, at certain conditions, the surfactant molecules present in the treatment fluids may associate to form the desired micelles, which, depending on a number of factors (e.g., VES surfactant concentration), may viscosify the treatment fluid. The micelles present in the treatment fluids of the present disclosure are generally sensitive to, among other things, the ionic strength of the treatment fluid, hydrocarbons, shear stress, and temperature. The viscosity of the treatment fluids of the present disclosure may be reduced by contact with the hydrocarbons contained therein. Likewise, in certain portions of the subterranean formation (e.g., carbonate formations), the treatment fluids of the present invention may experience a pH change, thereby facilitating a change in the ionic strength of the fluids. In certain embodiments, dilution of the treatment fluid may also facilitate a reduction in viscosity of the treatment fluid. For example, a treatment fluid of the present invention may be diluted by contact with formation fluids and/or subsequently injected treatment fluids, thereby reducing the concentration of the desired micelles in the treatment fluid and/or changing the ionic strength of the treatment fluid.

The treatment fluids of the present disclosure may be prepared by any suitable method. In some embodiments, the treatment fluids may be prepared on the job site. As an example of such an on-site method, a pre-formed VES surfactant formulation may be combined with an aqueous base fluid and an acid; or each of the components of the VES surfactant formulation may be mixed together on-site along with an aqueous base fluid and an acid. In one certain embodiment, a salt or an additive for maintaining and/or adjusting pH may be combined with the aqueous base fluid, among other things, to adjust the pH, or maintain the pH, in a desired range to promote the desired micelle formation, such that the treatment fluid exhibits viscoelastic behavior. The additive for maintaining and/or adjusting pH may be combined with the aqueous base fluid either prior to, after, or simultaneously with the VES surfactant. Furthermore, additional additives, as discussed above, may be combined with the treatment fluid and/or the aqueous base fluid as desired.

In one or more embodiments, the treatment fluids may be used in acidizing treatments, in which a treatment fluid comprising an aqueous base fluid, an acid, and the VES-containing well treatment fluid described herein may be introduced into a well bore that penetrates a subterranean formation, and the acid therein is allowed to react with at least one section of the near wellbore formation. In some acidizing embodiments, the treatment fluid may be introduced into the well bore at or above a pressure sufficient to create or enhance one or more fractures in at least a portion of the subterranean formation.

In certain embodiments, a treatment fluid comprising an aqueous base fluid, an acid, and a VES surfactant formulation may be employed as, among other things, a self-diverting acid. In self-diverting embodiments, the treatment fluid may be formulated so that its viscosity is initially very low (e.g., less than about 20 cP at 511 $s^{-1}$).

In these self-diverting embodiments, the treatment fluid may be introduced into a well bore that penetrates the subterranean formation and allowed to react with the subterranean formation. As the treatment fluid reacts with the subterranean formation, the presence of reaction by-products and/or spending of the acid may, inter alia, provide the conditions necessary for the viscosification of the treatment fluid into a gel sufficient to divert flow. The viscosity of the gel necessary to divert flow may depend on, among other factors, the depth of the gel plug created, the size of the wormhole to be plugged, the strength of the acid used, the composition of the treatment fluid to be diverted, the temperature of the subterranean formation, and the differential pressure. The gel may divert subsequently injected fluids to other portions of the subterranean formation. Because the treatment fluid generally will first enter perforations, natural fractures or higher permeability zones, which accept the most fluid (e.g., portions of the subterranean formation with higher permeabilities), other portions of this treatment fluid and/or other fluids (e.g., acidizing treatment fluids) subsequently introduced into the well bore may be diverted to less permeable portions of the subterranean formation. For example, a treatment fluid may be provided and introduced into a well bore that penetrates a subterranean formation, and a first portion of the treatment fluid may be allowed to react with at least a first portion of the subterranean formation so that (1) at least one section of the near wellbore formation is treated with acid and (2) the first portion of the treatment forms a gel sufficient to divert flow. In such embodiments, the gel may be allowed to at least partially divert a second portion of the treatment fluid and/or another fluid into a second portion of the subterranean formation.

The gelling and diversion optionally may be repeated as additional amounts of the treatment fluid are introduced into the well bore. For example, the second portion of the treatment fluid may be allowed to react with at least the second portion of the subterranean formation so that (1) at least one section of the near wellbore formation is treated with acid and (2) the second portion of the treatment fluid forms a gel sufficient to divert flow. After a chosen time, the treatment fluid may be recovered through the well bore.

EXAMPLES

The following examples are merely illustrative and should not be interpreted as limiting the scope of the present disclosure.

Materials

Sample Preparation

A 30% Calcium Chloride solution was used for the tests to approximate the amount of Calcium Chloride that would be formed if a 20% by weight Hydrochloric Acid (HCl) was reacted with Calcium Carbonate ($CaCO_3$). In a typical acidizing project, a 15-28% HCl solution would be injected into the carbonate formation to be acidized along with the VES-containing well treatment fluid. The acid would become spent by reaction with the Calcium Carbonate in the reservoir rock forming Calcium Chloride, water and carbon dioxide by the reaction shown below.

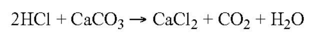

$$2HCl + CaCO_3 \rightarrow CaCl_2 + CO_2 + H_2O$$

In the following examples, a 30% $CaCl_2$ solution, zwitterionic and co-surfactant(s) are added alone or as a part of a prepared VES formulation such that the total surfactant concentration in the treatment fluid is between 1-4%.

The 30% $CaCl_2$ solution is prepared by mixing a 30 gm of anhydrous calcium chloride powder from Sigma Aldrich with 70 gm of DI-water. A 94 ml of mentioned solution is poured into a Warren blender connected to a variable-speed transformer. The mixing rate is initially adjusted to 20% of the total scale of transformer to create a vortex without forcing excess air into the solution. A total of 6 ml of a VES formulation containing main surfactant, co-surfactant, and one or more solvent is then added to the solution and the speed of mixing is increased to 40% of the transformer scale (close to 4000 rpm). VES is then blended in the solution for 4 minutes. The resulted foamy solution is transferred to 50-ml centrifuge tubes and centrifuged for 30-45 minutes at 3000 rpm. If needed, the final pH of the sample may be adjusted to a pH of 4-5 to simulate spent conditions in the formation. A 50-52 ml of the sample is then transferred to the Grace 5600. Pressure is increased to 400 psi using $N_2$ gas. Rotational shear is adjusted to 100 $s^{-1}$ and the viscosity is measured as a function of temperature from 75 to 300° F.

All surfactants used, including both the zwitterionic and co-surfactants were obtained from Solvay.

Methods

The viscosity of the VES formulations was measured using a Grace M5600 Viscometer at a shear rate of 100 $s^{-1}$.

Example 1—Synergistic Co-Surfactant Using Aminated Surfactants

Viscoelastic surfactant formulations according to the present disclosure were prepared according to Table 1. VES formulations were prepared with oleyl betaine as the zwitterionic surfactant and approximately 10 wt % of four different aminated surfactants or amide surfactants. The aminated/amide surfactants tested had an HLB value of 7.85, 8.51, and 12.75.

TABLE 1

| Sample | Co-Surfactant | HLB | co-surfactant wt % | Viscosity in 30% $CaCl_2$, cP 175° F. | 200° F. | 225° F. | 250° F. |
|---|---|---|---|---|---|---|---|
| Sample 1 (S1) | Oleylamine | 7.85 | 9.9 | 115 | 111 | 127 | 140 |
| Sample 2 (S2) | Tallow Alkyl Amine Ethoxylates (2EO) | 8.51 | 9.9 | 150 | 168 | 169 | 159 |
| Sample 3 (S3) | Diethanol Oleyl amide | 12.75 | 10.1 | 132 | 130 | 145 | 121 |
| Sample 4 (S4) | Tallow di-Amine Ethoxylates (3EO) | 8.5 | 9.9 | 106 | 107 | 94 | 52 |

As seen in Table 1, VES formulations with the four aminated surfactants have a stable viscosity at elevated temperatures.

The behavior of the VES formulations of the present invention containing a synergistic co-surfactant cosurfactant is quite unexpected. It is unexpected that the viscosity should remain stable over the temperature range as the temperature in increased. This demonstrates the superior high temperature stability of the viscoelastic systems containing the VES formulation of the present disclosure allowing for the VES surfactant formulation to render a non-usable surfactant at high temperatures usable.

The VES formulation of the present disclosure has been developed to provide high viscosity and elasticity and to be used as a diverting agent for acidizing application. The formulation is comprised of a main zwitterionic surfactant, a synergistic co-surfactant, and at least one miscible solvent. A synergy at optimized composition provides excellent rheology for diversion from none-performing individual surfactants. The disclosed VES formulation has an economical benefit compared to standard single surfactant formulations.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A viscoelastic surfactant formulation, comprising:

a zwitterionic surfactant with a general formula (I):

(I)

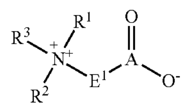

where A is a C or SO, $E^1$ is a linear or branched, saturated or unsaturated hydrocarbon chain having 1 to 4 carbon atoms, $R^1$ and $R^2$ are selected from alkyl groups of from 1 to about 4 carbon atoms, and $R^3$ is a linear or branched, saturated or unsaturated alkyl chain having less than 22 carbon atoms or is $—(CH_2)_nNHC(O)—R^4$, where $R^4$ is a linear or branched, saturated or unsaturated alkyl chain having less than 22 carbon atoms and n ranges from 1 to 6;

a synergistic co-surfactant containing a primary, secondary, or tertiary amine; amido group; amine oxide; or combinations thereof, wherein the co-surfactant is present in an amount higher than 9.5 wt % and less than 22 wt % based on a total weight of the surfactants; and at least one miscible solvent, wherein a viscosity of the viscoelastic surfactant formulation is maintained within a range having a lower limit of more than 85 cP at temperatures ranging from 175° F. to 250° F., wherein the viscosity is measured using a Grace M5600 Viscometer at a shear rate of 100 $s^{-1}$.

2. The viscoelastic surfactant formulation of claim 1, wherein $R^4$ has 16-20 carbon atoms.

3. The viscoelastic surfactant formulation of claim 2, wherein $R^4$ has 18 carbon atoms.

4. The viscoelastic surfactant formulation of claim 1, wherein the synergistic co-surfactant has the formula:

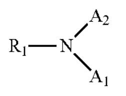

where $R_1$ is a branched or linear, saturated or unsaturated alkyl chain with 9 to 18 carbon atoms or an alkyl aryl bearing a linear or branched alkyl chain ranging from 4 to 16 carbon atoms; or is $R_0$—C(O)— where $R_0$ is a branched or linear, saturated or unsaturated alkyl chains with 9 to 18 carbon atoms or an alkyl aryl bearing a linear or branched alkyl chain ranging from 4 to 16 carbon atoms; and $A_1$ and $A_2$ are independently selected from H, —$CH_2CH_2OH$ or —$(CH_2CH_2$—O—$)_n$H or —$(CH_2)_x$—$NH_2$, where n ranges from 1 to 4, and x ranges from 1 to 4.

5. The viscoelastic surfactant formulation of claim 1, wherein the co-surfactant is diethanol oleyl amide, oleylamine, tallow alkyl amine ethoxylate, or tallow di-amine ethoxylate.

6. The viscoelastic surfactant formulation of claim 1, wherein the co-surfactant is present in an amount of between 9.9 wt % to 10.1 wt % based on the total weight of the surfactants.

7. The viscoelastic surfactant formulation of claim 1, wherein the zwitterionic surfactant is present in amount ranging from 5 wt % to 60 wt % by weight of the viscoelastic surfactant formulation.

8. The viscoelastic surfactant formulation of claim 1, wherein the at least one miscible solvent is water, secondary alcohols, glycols, glycol ethers, acetone, glycerol, or combinations thereof.

9. The viscoelastic surfactant formulation of claim 1, wherein the zwitterionic surfactant is present in amount ranging from 0.5 wt % to 5 wt % by weight of the viscoelastic surfactant formulation.

10. The viscoelastic surfactant formulation of claim 1, wherein the viscosity of the viscoelastic surfactant formulation is maintained within a range having an upper limit up to 170 cP at temperatures ranging from 175° F. to 250° F.

11. A well treatment fluid comprising:

an aqueous fluid;

an acid;

a zwitterionic surfactant with a general formula (I):

(I)

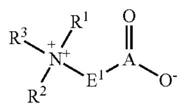

where A is a C or SO, $E^1$ is a linear or branched, saturated or unsaturated hydrocarbon chain having 1 to 4 carbon atoms, $R^1$ and $R^2$ are selected from alkyl groups of from 1 to about 4 carbon atoms, and $R^3$ is a linear or branched, saturated or unsaturated alkyl chain having less than 22 carbon atoms or is —$(CH_2)_n$NHC(O)—$R^4$, where $R^4$ is a linear or branched, saturated or unsaturated alkyl chain having less than 22 carbon atoms and n ranges from 1 to 6; and a synergistic co-surfactant containing a primary, secondary, or tertiary amine; amido group; amine oxide; or combinations thereof, wherein the co-surfactant is present in an amount higher than 9.5 wt % and less than 22 wt % based on a total weight of the surfactants, wherein the zwitterionic surfactant and synergistic co-surfactant are added to the well treatment fluid as a viscoelastic surfactant formulation further comprising at least one miscible solvent, wherein a viscosity of the viscoelastic surfactant formulation is maintained within a range having a lower limit of more than 85 cP at temperatures ranging from 175° F. to 250° F. wherein the viscosity is measured using a Grace M5600 Viscometer at a shear rate of 100 $s^{-1}$.

12. The well treatment fluid of claim 11, wherein the viscoelastic surfactant formulation has a viscosity greater than 85 cP at a temperature of at least 225° F.

13. The well treatment fluid of claim 11, wherein the zwitterionic surfactant and synergistic co-surfactant are present in a combined amount ranging from 0.5 to 5 wt % of the treatment fluid.

14. The well treatment fluid of claim 11, wherein the synergistic co-surfactant has the formula:

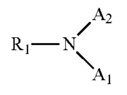

where $R_1$ is a branched or linear, saturated or unsaturated alkyl chain with 9 to 18 carbon atoms or an alkyl aryl bearing a linear or branched alkyl chain ranging from 4 to 16 carbon atoms; or is $R_0$—C(O)— where $R_0$ is a branched or linear, saturated or unsaturated alkyl chains with 9 to 18 carbon atoms or an alkyl aryl bearing a linear or branched alkyl chain ranging from 4 to 16 carbon atoms; and $A_1$ and $A_2$ are independently selected from H, —$CH_2CH_2OH$ or —$(CH_2CH_2$—O—$)_n$H or —$(CH_2)_x$—$NH_2$, where n ranges from 1 to 4, and x ranges from 1 to 4.

15. The well treatment fluid of claim 11, wherein the co-surfactant is diethanol oleyl amide, oleylamine, tallow alkyl amine ethoxylate, or tallow di-amine ethoxylate.

16. The well treatment fluid of claim 11, wherein the co-surfactant is present in an amount of between 9.9 wt % to 10.1 wt % based on the total weight of the surfactants.

17. A method of treating a formation, comprising:

injecting the well treatment fluid of claim 11 into a formation.

18. The method of claim 17, wherein the well treatment fluid is injected during an acidizing operation.

* * * * *